United States Patent [19]

Harbeke, Jr.

[11] Patent Number: 5,058,341
[45] Date of Patent: Oct. 22, 1991

[54] METHOD FOR CONSTRUCTING FIRE-STOP COLLAR ASSEMBLY AND APPARATUS THEREOF

[75] Inventor: Jerry R. Harbeke, Jr., Arlington, Va.

[73] Assignee: MSP Products, Inc., N. Lake Worth, Fla.

[21] Appl. No.: 509,816

[22] Filed: Apr. 17, 1990

Related U.S. Application Data

[62] Division of Ser. No. 401,111, Aug. 31, 1989, Pat. No. 4,951,442.

[51] Int. Cl.$^5$ .............................................. E04C 2/00
[52] U.S. Cl. ......................................... 52/232; 52/317
[58] Field of Search ................. 52/317, 232; 285/367, 285/373

[56] References Cited

U.S. PATENT DOCUMENTS

| | | | |
|---|---|---|---|
| 234,799 | 11/1880 | Neely | 285/373 |
| 1,060,328 | 4/1913 | Farley et al. | 126/314 |
| 1,976,797 | 10/1934 | Naylor | 285/373 |
| 2,120,221 | 7/1938 | Cornell | 285/373 |
| 2,417,741 | 3/1947 | Dillon | 285/367 |
| 4,109,423 | 8/1978 | Perrain | 52/1 |
| 4,136,707 | 1/1979 | Gaillot et al. | 137/75 |
| 4,221,092 | 9/1980 | Johnson | 52/232 |
| 4,307,546 | 12/1981 | Dolder | 52/1 |
| 4,848,043 | 7/1989 | Harbeke | 52/1 |
| 4,916,800 | 4/1990 | Harbeke | 52/232 |

OTHER PUBLICATIONS

3M Adverstisement (2 pages).

International Publication No. WO89/04407 published 18 May 1989, 2 pages Dwg., 20 pages spec.

Primary Examiner—James L. Ridgill, Jr.
Attorney, Agent, or Firm—Branigan & Butler Griffin

[57] ABSTRACT

A method of constructing a fire-stop collar assembly involves the steps of choosing a dummy pipe (14) at a factory which is an approximate size and shape of a pipe at an installment site on which a fire-stop collar assembly (10,54) produced by this method is to be mounted and, at the factory, wrapping an intumescent collar (34,82) into an approximate ring about an outer surface of the dummy pipe. Also, at the factor, a metallic band (32) is wrapped about the intumescent collar while the collar is wrapped about the dummy pipe and the end portions (36,38) are held together by a fastening device (40,56) while the collar is wrapped about the dummy pipe. Still at the factory, the dummy pipe is removed from the intumescent collar and the metallic band by longitudinal movement along the dummy pipe, thereby leaving rings of intumescent collar and the metallic band held together as an integral fire-stop collar assembly. Thereafter, the thusly assembled fire-stop collar assembly is transported away from the factory to be delivered to a separate installment site for permanent engagement on the pipe at the installment site. In one embodiment, the intumescent collar (82) is glued to the metallic band, and two longitudinal cuts (60,64 and 62,66) are placed along the intumescent collar, the longitudinal cuts being spaced approximately 180° from one another. The metallic band is compressed by a strap clamp (56) which can be removed and the fire-stop collar assembly can be easily opened to be placed on the pipe.

6 Claims, 3 Drawing Sheets

METHOD FOR CONSTRUCTING FIRE-STOP COLLAR ASSEMBLY AND APPARATUS THEREOF

This is a divisional application of Ser. No. 07/401,111, filed Aug. 31, 1989 now U.S. Pat. No. 4,951,447 issued Aug. 28, 1990.

BACKGROUND OF THE INVENTION

This invention relates generally to the art of devices for preventing the spread of fire through plumbing pipes of buildings, and more particularly, to the art of fire-stop collars for surrounding pipes at wall barriers.

For a number of years, pipe networks which have extended through floors of buildings have been made fire retardant by encircling individual pipes with fire-stop intumescent material which expands upon contact with heat to close off pipe openings in the floors. It has been suggested to encircle such an intumescent collar with a container formed of a metallic band and then to attach the metallic container to a bottom surface of a floor through which the pipe passes. However, difficulties in accomplishing this have been encountered with prior-art arrangements because the intumescent material must often be installed at a different time from the pipe, sometimes being put in place after the pipe has been extended through holes in floors. The main difficulty in carrying out such a procedure is that prior-art fire-stop intumescent material collars have had to be formed at job sites, which has been inconvenient and time consuming for workman. It is therefore an object of this invention to provide a method for constructing a fire-stop collar assembly, at a factory which can be mounted on a pipe string at a separate installation site after the pipe has been assembled.

A suggestion has been made for producing a fire-stop pipe coupling adaptor at a factory which includes a pipe coupling having a fire-stop collar and metallic band wrapped thereabout. This fire-stop pipe coupling adaptor is to be used with a coupler which is cast into a wall barrier of a building. After a concrete wall barrier has cured with a cast-in coupler molded therein a male coupling member of the pipe coupling of the adaptor is inserted into one end of the cast-in coupling and radial tabs of the metallic band of the adaptor are then attached to the concrete wall barrier so as to hold the adaptor against the barrier at the cast-in coupling. A further pipe is then mounted to an outside end of the pipe coupling of the fire-stop pipe coupling adaptor. This fire-stop pipe coupling adaptor has many advantages, however, it does have some disadvantage. One disadvantage is that it requires additional work by a plumber, first attaching the adaptor to the cast-in coupling and then attaching a pipe to the adaptor. Also, such a fire-stop pipe coupling adaptor is not sufficiently flexible in use in that it can only be installed before a pipe string has been attached to a cast-in coupling. In this regard, sometimes it is desireable for a plumber to install a pipe string and then later install an intumescent collar. Thus, it is an object of this invention, to provide a method for constructing a fire-stop collar assembly which does not require an undue amount of work by a plumber to install and which can be installed either before or after a pipe string has been attached to a cast-in coupling.

Yet another difficulty with the prior-art fire-stop pipe coupling adaptor described above is that it comprises a special pipe coupling and is thereby somewhat expensive to produce. Thus, it is an object of this invention to provide a method for constructing a pipe-stop collar assembly which can be used with standard pipe.

It is a further object of this invention, to provide a method of constructing a fire-stop collar assembly which is relatively easy and relatively inexpensive to carry out and which thereby produces relatively inexpensive fire-stop collar assemblies.

It is a further object of this invention to provide a fire-stop collar assembly which is extremely easy to install and which can be installed quickly by normally trained plumbers.

SUMMARY OF THE INVENTION

According to principles of this invention, a method of constructing a fire-stop collar assembly at a factory separate from an installment site for engagement with a pipe at the installment site comprising the steps of wrapping an intumescent collar and a metallic band about a dummy pipe and, after fastening the metallic band into a ring so as to hold the fire-stop collar assembly together, sliding the dummy pipe longitudinally from the intumescent collar and the metallic band so as to leave the intumescent collar and metallic band as the fire-stop collar assembly. The fire-stop collar assembly is then transported from the factory to be delivered to the separate installment site for being mounted on a pipe thereat. One embodiment of the invention involves making the intumescent collar of two layers of intumescent material which are glued to one another with glue that cures while the intumescent material is wrapped about the dummy pipe. In this embodiment, the intumescent collar is also glued to the metallic band and is longitudinally cut along two break lines which are separated by about 180°, one of the break lines being at the ends of the metallic band and the metallic band being fastened together by a strap clamp.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
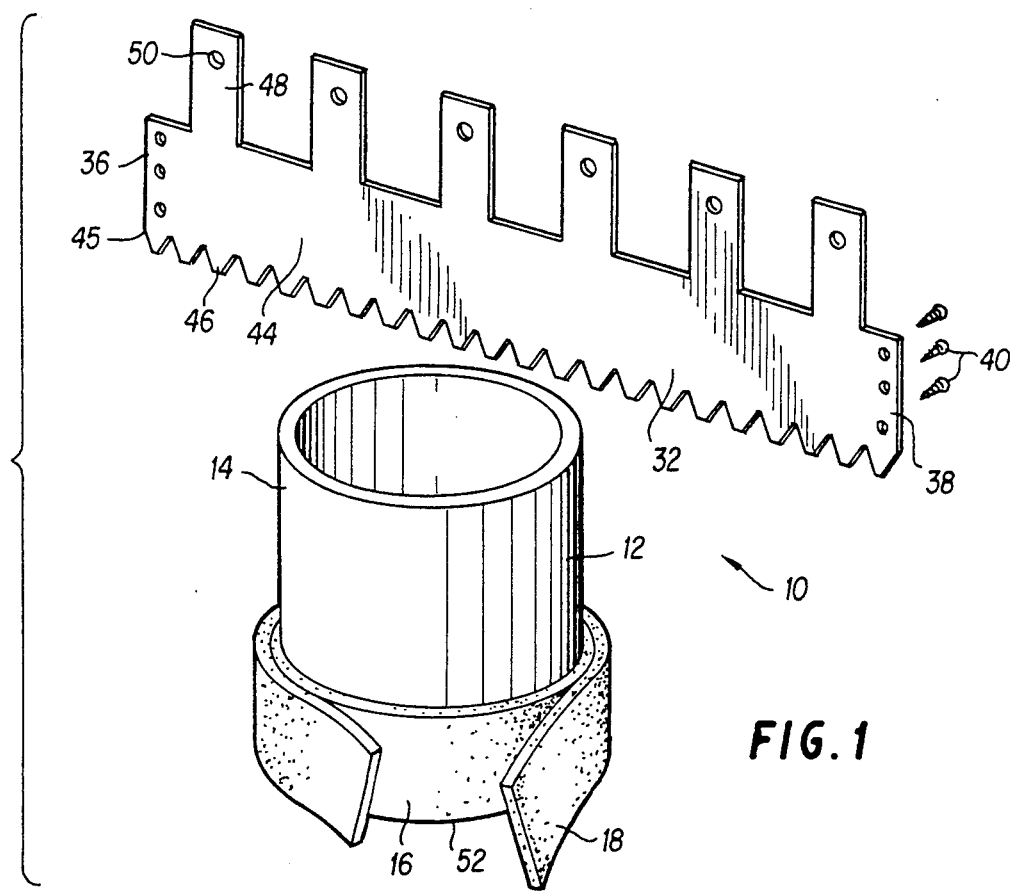
FIG. 1 is an exploded isometric view of a fire-stop collar assembly constructed by a method of this invention illustrating various steps of the method and also including thereon a dummy pipe used in the method.

Referring to FIG. 1, the construction of a fire-stop collar assembly 10, is carried out at a factory, the first step of a process therefor being to choose a cylindrically-shaped dummy pipe 12 having an outer surface 14 which is the same size, or slightly larger than, an outer surface of a pipe on which the fire-stop collar 10 is to be mounted at an installment site. In this respect, the dummy pipe 12 can actually be a pipe of the type on which the fire-stop collar assembly 10 is to be mounted but in one embodiment, it is a solid cylinder having an outer surface 14 which is slightly larger than a pipe on which the fire-stop collar assembly 10 is to be mounted.

Once the dummy pipe 12 is selected, inner and outer intumescent bands 16 and 18 are cut and wrapped thereabout as is shown in FIG. 1 so as to produce tightly wrapped inner and outer, substantially-closed, intumescent rings 20 and 22 each having abutting ends 24 and 26 so as to form longitudinal cut, or break, lines 28 and 30 in the intumescent rings 20 and 22. Thereafter, or simultaneously therewith, a metallic band 32 constructed of sheet metal is wrapped about an intumescent collar 34 formed by the intumescent rings 20 and 22 and first and second end portions 36 and 38 of the metallic band 32 are caused to overlap as the metallic band 32 is pulled tightly about the intumescent collar 34 and the dummy pipe 12. In this regard, this operation is carried out in a press which tightly compresses the intumescent rings 20 and 22 against each other and the intumescent collar 34 against the dummy pipe 12. In this embodiment, the length of the intumescent bands 16 and 18 are such that their abutting ends 24 and 26 are pressed tightly against each other so as to hold the intumescent rings 20 and 22 in their circular configuration, resisting radially inwardly forces of the metallic band 32. Once the metallic band 32 is sufficiently tightly pulled about the intumescent collar 34 and the dummy pipe 12, screws 40 are inserted through holes in the first and second end portions 36 and 38 of the metallic band 32 so as to hold the metallic band 32 in a ring about the intumescent collar 34 and to provide these members with fixed diameters. It should be noted that the screws 40 not only extend through the first and second end portions 36 and 38 of the metallic band 32 but also extend into the intumescent collar 34 to further hold the intumescent collar 34 against longitudinal movement within the ring 42 formed by the metallic band 32.

It can be seen in FIG. 1 that before the above-described steps are carried out, the metallic band 32 is pre-shaped to form a substantially rectangular tape portion 44 having a width which is approximately equal to the width of the intumescent bands 16 and 18. Extending from a bottom edge 45 of the tape portion 44 are heat-transfer tabs 46 and extending from a top edge of the rectangular-shaped tape portion 44 are much longer attachment tabs 48 having holes 50 therein. Once the metallic band 32 is wrapped about the intumescent collar 34 so as to form the metallic ring 42, the heat-transfer tabs 46 are bent radially inwardly, to be below the intumescent collar 34. These heat-transfer tabs 46 aid in holding the intumescent collar 34 in the metallic ring 42 but yet there are spaces therebetween to allow heat from a fire below the fire-stop collar assembly 10 to readily reach a lower edge 52 of the intumescent collar 34. Further, the heat-transfer tabs 46 conduct heat to the rest of the metallic ring 42 to thereby heat a radially-directed outer surface of the intumescent collar 34 for causing the intumescent collar 34 to swell, thereby closing off an opening through a barrier to which the attachment tabs 48 are attached. With regard to the attachment tabs, once the fire-stop collar assembly 10 is ready for use, these tabs are bent radially outwardly, and rivets, screws or other such fasteners are driven through the holes 50 into a barrier to attach the fire-stop collar assembly 10 to the barrier.

Figure 2:
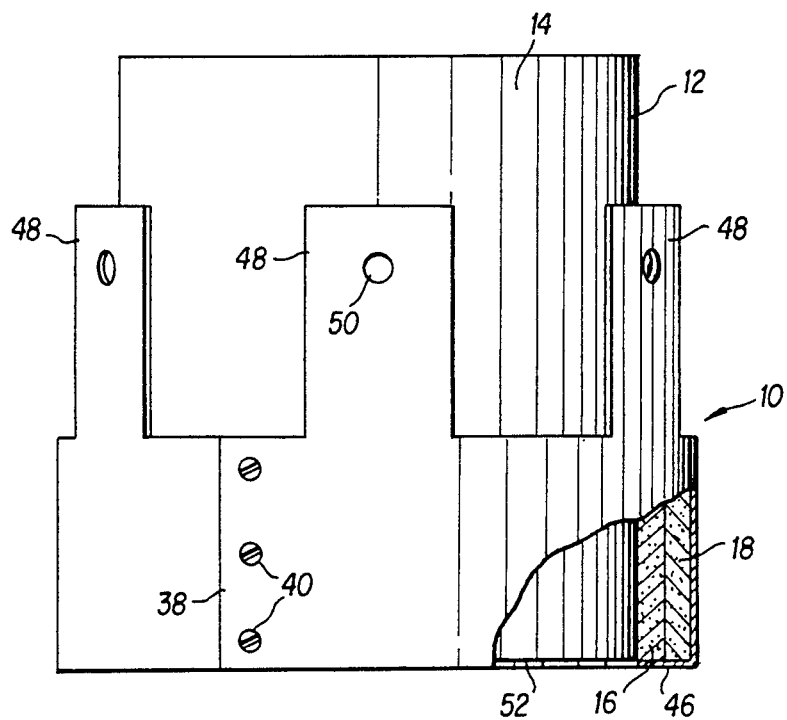
FIG. 2 is a side, partially cutaway, view of the fire-stop collar assembly of FIG. 1 mounted on the dummy pipe.
Figure 3:
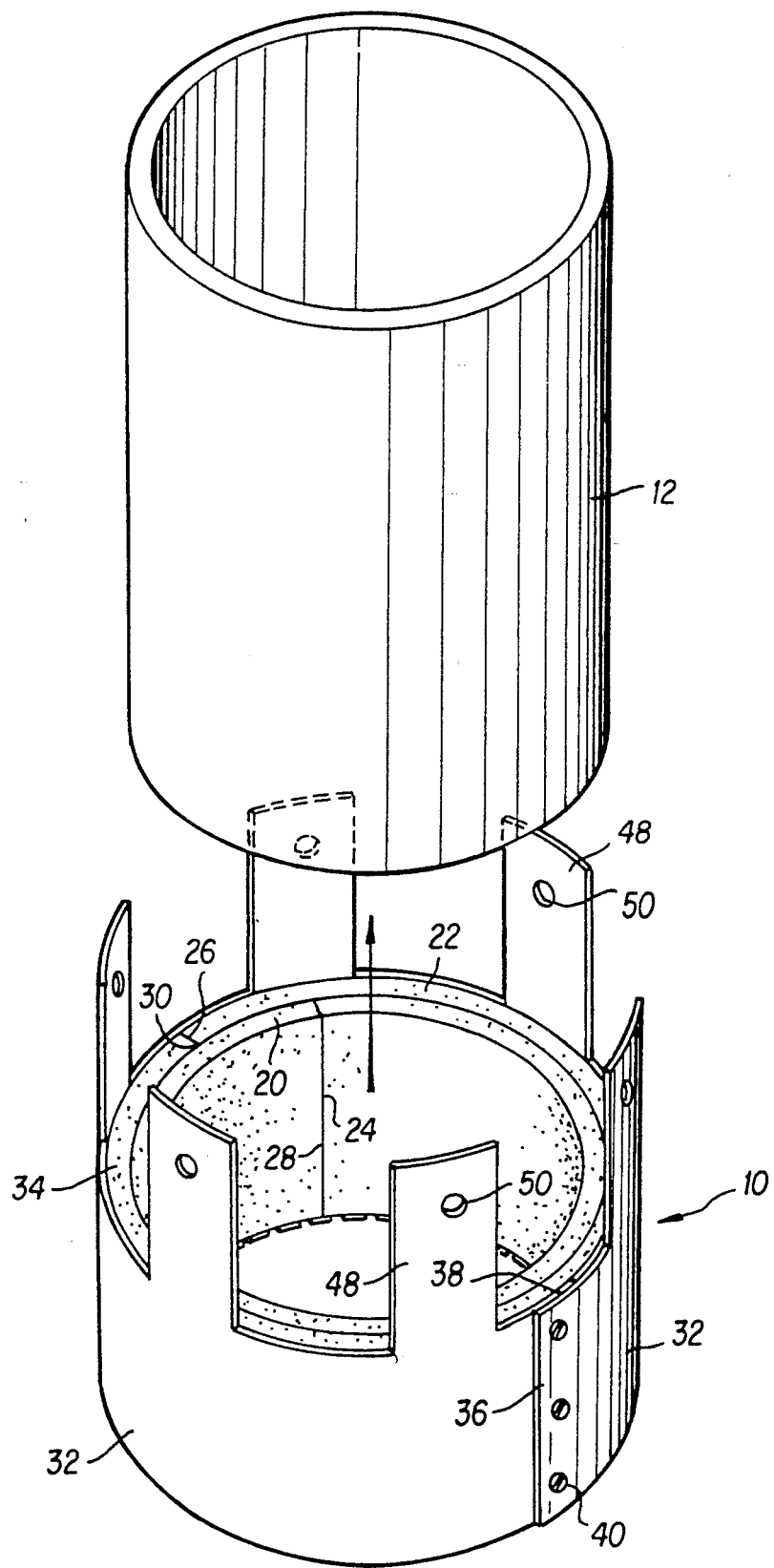
FIG. 3 is an isometric exploded view of the apparatus of FIGS. 1 and 2 showing a further step in the method of this invention.

In the embodiment of FIGS. 1-3, the heat-transfer tabs 46 are actually longer than the thickness of the intumescent collar, so that they extend radially inwardly beyond an inner diameter of the intumescent collar 34. With the heat-transfer tabs 46 extending inwardly beyond an inner surface of the intumescent collar 34, it is only possible to apply the fire-stop collar assembly 10 to the end of a female coupler so that these heat-transfer tabs 46 extend over the end of the female coupler while not interfering with a male pipe being placed into the female coupler. However, the tabs could be made shorter so that the fire-stop collar can be applied to any pipe at any position along the pipe.

In any event, with reference to FIG. 3, once the fire-stop collar assembly 10 is fabricated as described above, opposite forces are applied to the dummy pipe 12 and to the fire-stop collar assembly 10 so that the dummy pipe 12 is slid longitudinally upwardly, relative to the fire-stop collar assembly 10, out of the intumescent collar, thereby leaving the fire-stop collar assembly 10 as an integral unit held together by static forces produced by the metallic ring 42 and the intumescent collar 34.

All of the above steps, with the possible exception of the attachment-tab bending steps, are carried out at a factory, separate from an installment site. The fire-stop collar assembly 10 is then transported away from the factory for eventually being transported to an installment site where it is longitudinally slid on a pipe coupling which is then, or which has already been, positioned adjacent to a wall barrier as part of a pipe string passing through the wall barrier. The attachment tabs 48 which have now been radially bent, are then attached to the wall barrier to hold the fire-stop collar assembly 10 in position thereagainst.

Again, the heat-transfer tabs 46 can be shorter than the thickness of the intumescent collar 34, in which case, the fire-stop collar assembly can be mounted on a pipe which is the same size as the dummy pipe 12 at any point along the pipe. Because the dummy pipe 12 is slightly larger than, or approximately the same size as, a pipe on which the fire-stop collar assembly is mounted at an installment site, the fire-stop collar assembly 10 fits the pipe (the word "pipe" also including a copuler) on which it is mounted at the installment site, quite tightly, and a force is required to insert, or slide, the pipe lengthwise, at the installment site, into the fire-stop collar assembly 10; or vise versa, i.e. slide collar over pipe.

In the FIGS. 1-3 embodiment, the cut, or break, lines 28 and 30 of the intumescent band 16 and 18 do not need to be oriented to coincide with one another nor do they need to coincide with the first and second end portions 36 and 38 of the metallic band 32 forming the metallic ring 42. In fact, it is preferable that none of these ends be adjacent one another so that the whole assembly remains together without having a particular weak area. In this respect, although the intumescent collar 34 is constructed of two intumescent bands 16 and 18 or layers, in this embodiment, it is not necessary for these layers to be glued together or for them to be glued to the metallic band 32. Once the screws 40 are used to attach the end portions 36 and 38 of the metallic band 32, and thereby form the metallic ring 42, all of the members of the assembly are held as a unit by internal static forces, even after the dummy pipe 12 is removed.

Figure 4:
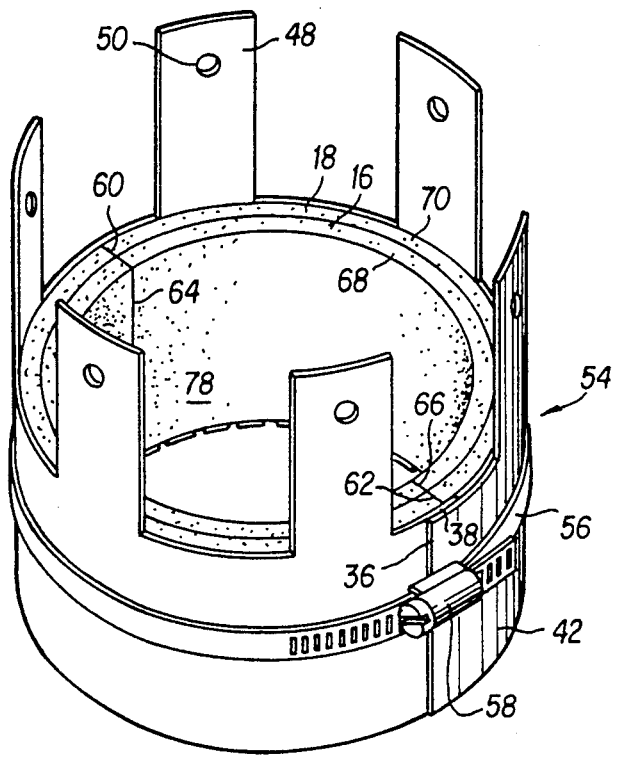
FIG. 4 is an isometric view of another embodiment of a fire-stop collar assembly constructed by the method of this invention.

This method of manufacturing can also be used for manufacturing the fire-stop collar assembly 54 of FIG. 4. In this case, the method also involves wrapping the intumescent bands 16 and 18 as well as the metallic band 32 about the dummy pipe 12. However, the method of making the fire-stop collar assembly 54 involves holding the ends 36 and 38 of the metallic ring 42 together by means of a surrounding strap clamp 56, which is basically an automobile hose clamp having a worm-tightener 58. The strap clamp 56 encircles the metallic ring 42 in this case, and is tightened by the worm tightener 58 so as to compress the metallic ring 42 and the intumescent bands 16 and 18 on the dummy pipe 12.

Figure 5:
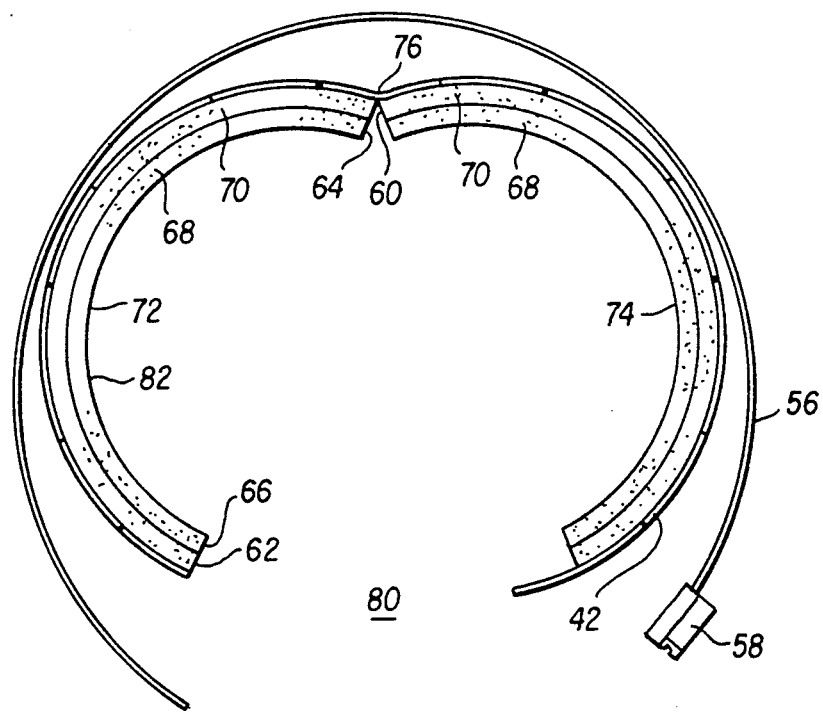
FIG. 5 is a top, partially exploded view of the apparatus of FIG. 4 illustrating the construction of the assembly of FIG. 4.

However, there are additional steps that are carried out in the manufacture of the fire-stop collar assembly of FIGS. 4 and 5. That is, before the strap clamp 56 is used to compress the metallic ring 42 and the intumescent bands 16 and 18 on the dummy pipe 12, glue is placed between an outer surface of the intumescent band 18 and an inner surface of the metallic ring 42 and glue is applied between the intumescent bands 16 and 18. Also, in manufacturing the embodiment of FIGS. 4 and 5, there are two break lines 60 and 62 made in the outer intumescent band 18 and there are two longitudinal break lines 64 and 66 made in the inner intumescent band 16. It should be noted that the longitudinal breaks, or cuts, 64 and 60 of the intumescent ring 68 and 70 are coincident with one another and that the break lines 62 and 66 of the respective outer and inner intumescent rings are also coincident. Further, it should be noted that the break lines 60 and 64 of the inner and outer intumescent rings 68 and 70 are approximately 180° from the break lines 62 and 66 of the outer and inner intumescent rings 68 and 70 and that the break lines 62 and 66 are approximately coincident with the first and second end portions 36 and 38 of the metallic ring 42.

Once the glue has cured, the strap clamp 56 can be loosened and the fire-stop collar assembly 54 can be removed from the dummy pipe 12 by sliding the dummy pipe out longitudinally as is shown in FIG. 3. But with this embodiment, it is also possible to completely release the strap clamp 56 and then pivot opposite sides 72 and 74 of the assembly open about a hinge line 76. The hinge line 76 is formed by a bend in the metallic ring 42. When the sides 72 and 74 are hinged away from one another, as is shown in FIG. 5, opposite sides of the intumescent rings 68 and 70 approximately retain their circular shape and size because they are formed by three layers which are glued together, the metallic ring and the two intumescent bands.

In any case, once the fire-stop collar assembly 54 is removed from the dummy pipe 12 at a factory, either longitudinally or laterally, it is then transported away from the factory to eventually be transported to an installment site where it is placed on a pipe having an outer diameter which is approximately the same as the outer diameter of the dummy pipe 12. With the FIGS. 4 and 5 embodiment, this can be accomplished either by inserting the pipe longitudinally into a bore 78 of the fire-stop collar assembly 54 or by releasing the strap clamp 56, hinging opposite sides 72 and 74 of the assembly apart, manipulating the fire-stop collar assembly 54 so that a pipe on which it is to be mounted passes through an opening 80 between the opposite sides 72 and 74 and then again closing the end portions of the strap clamp 56 to bring the first and second end portions 36 and 38 together to hold the fire-stop collar assembly 54 tightly on the pipe. The attachment tabs 48 are attached to a barrier through which the pipe on which the fire-stop collar assembly 54 is mounted.

The embodiment of FIGS. 4 and 5 has the obvious advantage that it can be mounted on a pipe string after the pipe string has already been installed because its opposite sides 72 and 74 of its assembly can be hinged apart to create the lateral opening 80 for allowing it to be placed on a pipe. The glue which was placed between the intumescent rings 68 and 70 and between the outer intumescent ring 70 and the metallic ring 42 holds all of these member in their proper size and shape and holds them all together when they are "opened up" as is shown in FIG. 5 for mounting them on a pipe. It is advantageous that an intumescent collar 82 of the FIG. 5 embodiment is constructed of two intumescent bands 16 and 18 because this allows greater flexibility for shaping these members about the dummy pipe 12, but yet after the parts are glued together, creates internal forces which cause them to hold their sizes and shapes.

While the invention has been particularly shown and described with reference to preferred embodiments, it will be understood by those skilled in the art, that various changes in form and detail may be made therein without departing from the spirit and scope of the invention. For example, it would be possible to glue all of the various layers of the apparatus of the FIGS. 1-3 embodiment together. Further, it should be appreciated that a smaller dummy pipe 12 can be used in the FIGS. 4-5 embodiment than in the FIG. 3 embodiment inasmuch as the diameter of the fire-stop assembly of FIG. 3 cannot be increased for mounting the assembly on a pipe whereas the fire-stop collar assembly 54 of the FIGS. 4 and 5 embodiment can have its diameter increased for placing it on a pipe string and thereafter decreased for holding it tightly on a the pipe string. Also, it would be possible to practice this invention with an intumescent collar of one or more layers.

The embodiments of the invention in which an exclusive property or privilege are claimed are defined as follows:

1. A fire-stop collar assembly laterally mountable on a pipe comprising:
 a broken ring-shaped intumescent collar having a selectively openable, bendable metallic band with first and second ends extending thereabout and being attached thereto so that these members remain attached even when said metallic band is bent open for mounting the fire-stop collar assembly laterally on a pipe, the ring-shaped intumescent collar having at least one longitudinal break line positioned adjacent ends of the metallic band, said metallic band being bendable;
 a fastening means for selectively compressing the metallic band into a tight ring with said first and second ends close together, and for allowing said ends of the metallic band to be separated for opening said fire stop collar assembly for mounting it on a pipe;
 whereby the fire-stop collar assembly can be hinged open as a unit, with said intumescent collar remaining attached to said metallic band, placed about a pipe, and then closed again by the fastening means.

2. A fire-stop collar assembly as in claim 1 wherein said fastening means is a separate strap type clamp which extends about the metallic band.

3. The fire-stop collar assembly as in claim 1 wherein the intumescent collar is constructed of two intumescent layers attached together.

4. A fire-stop collar assembly as in claim 1 where in the intumescent collar is constructed of two intumescent band layers glued together.

5. A fire-stop collar assembly as in claim 1 wherein said ring-shaped intumescent collar is attached to said metallic band by means of glue.

6. A fire-stop collar assembly as in claim 1 wherein said intumescent collar has at least two longitudinal break lines spaced from one another, with one break line being positioned adjacent ends of the metallic band for opening with ends of said metallic band and the other break line forming a hinge line at which said metallic band primarily bends.

* * * * *

UNITED STATES PATENT AND TRADEMARK OFFICE
CERTIFICATE OF CORRECTION

PATENT NO. : 5,058,341
DATED : Oct.22, 1991
INVENTOR(S) : Gerold R. Harbeke

It is certified that error appears in the above-identified patent and that said Letters Patent is hereby corrected as shown below:

ON THE TITLE PAGE: correct the name of the inventor to be --Gerold R. Harbeke-- (no Jr.).

Abstract column, correct the name of the law firm to be --Griffin, Branigan & Butler--.

Signed and Sealed this

Ninth Day of February, 1993

Attest:

STEPHEN G. KUNIN

*Attesting Officer*    *Acting Commissioner of Patents and Trademarks*